United States Patent [19]

Kuisma

[11] Patent Number: 4,594,639

[45] Date of Patent: Jun. 10, 1986

[54] CAPACITIVE PRESSURE DETECTOR

[75] Inventor: Heikki T. Kuisma, Helsinki, Finland

[73] Assignee: Vaisala Oy, Helsinki, Finland

[21] Appl. No.: 701,870

[22] Filed: Feb. 15, 1985

[30] Foreign Application Priority Data

Feb. 21, 1984 [FI] Finland ................... 840700

[51] Int. Cl.$^4$ .................... H01G 7/00; G01L 9/12
[52] U.S. Cl. ................... 361/283; 73/718
[58] Field of Search ............ 73/718, 724; 361/283

[56] References Cited

U.S. PATENT DOCUMENTS

| | | | |
|---|---|---|---|
| 3,397,278 | 8/1968 | Pomerantz | 174/52 FP |
| 3,965,746 | 6/1976 | Rabek | 73/718 |
| 4,257,274 | 3/1981 | Shimada et al. | 73/718 |
| 4,386,453 | 6/1983 | Giachino et al. | 361/283 X |
| 4,390,925 | 6/1983 | Freud | 73/718 X |
| 4,467,394 | 8/1984 | Grantham et al. | 361/283 |

OTHER PUBLICATIONS

IEEE Transactions on Electron Devices, vol. ED-25 (1978), No. 10, pp. 1185-1193.

*Primary Examiner*—Donald A. Griffin
*Attorney, Agent, or Firm*—Birch, Stewart, Kolasch & Birch

[57] ABSTRACT

A capacitive pressure detector, comprising a plate-shaped base (13), a stationary capacitor plate (14) disposed on the base (13), an aneroid capsule (6) arranged in connection with the base (13) and proviced with an area (8) with a mobile capacitor plate facing the stationary capacitor plate (14) and changing its distance from the stationary capacitor disc (14) by the effect of pressure. On the plate-shaped base (13), a silicon plate (5) is disposed, into which a membrane-like middle portion (8) functioning as the mobile capacitor plate has been worked. On the silicon plate (5), a preferably plate-shaped cover structure (12) is hermetically disposed so that a basin space (6) of the aneroid capsule is formed between the cover structure (12) and said middle portion (8). The membrane-like middle portion (8) of the silicon plate (5) is connected to the edge portion of the silicon plate (5) by means of a relatively thin-walled collar structure (11) extending from the edge of the middle portion (8) to the proximity of the inner face of the cover structure (12).

6 Claims, 4 Drawing Figures

CAPACITIVE PRESSURE DETECTOR

The present invention is concerned with a capacitive pressure detector in accordance with the preamble of claim 1.

In respect of the prior-art technology, to begin with, reference should be made to the following publications: [1] U.S. Pat. No. 4,386,543 (Giachino et al.) [2] U.S. Pat. No. 4,257,274 (Shimada et al.) [3] U.S. Pat. No. 4,332,000 (Petersen) [4] U.S. Pat. No. 4,390,925 (Freud) [5] U.S. Pat. No. 3,397,278 (Pomerantz) [6] K. E. Bean, "Anisotropic Etching of Silicon", IEEE Transactions on Electron Devices, Vol. ED-25 (1978) No. 10, pp. 1185–93.

As is well known, miniaturized capacitive pressure detectors can be made of silicon and glass (cited papers [1] to [4]). The prior-art constructions are based on patterning of the silicon by means of microlithography, on its working by etching, and on joining of the glass parts by means of an electrostatic method (cited paper [5]).

Most commonly, low-alkali barosilicate glass has been used in detectors (e.g., Corning Glass, type 7740, "Pyrex"). It is suitable for this purpose, for alkali-metal ions are a prerequisite for the formation of an electrostatic joint, and its thermal expansion coefficient is quite close to the corresponding coefficient of silicon. At the room temperature, the coefficient of glass is 3.25 ppm/°C. and that of silicon 2.5 ppm/°C. At high temperatures, the thermal expansion of silicon increases non-linearly and exceeds the corresponding coefficient of glass. The difference in thermal expansion coefficients is the most important factor affecting the temperature behaviour of a pressure detector.

FIG. 1 is a schematical illustration of the basis for the dependence on temperature. A silicon piece 2 provided with a thin, pressure-sensitive part 3 is attached to a glass plate 1. The difference in pressure deflects the membrane 3 and changes the distance between it and the stationary capacitor plate 4 placed on the glass plate 1, as well as the capacitance between them. If the temperature is now raised and the difference in pressure is kept unchanged, a tensile strain resulting from the difference in thermal expansion is subjected to the membrane 3 in the horizontal plane. This strain attempts to reduce the deflection caused by the pressure. If the pressure-sensitivity of the deflection without tensile strain is $S_o$, it is with tensile strain $$S = \frac{S_o}{1 + K(a/h)^2 \epsilon},$$

wherein a is the side of a square membrane or the diameter of a circular membrane, h is the thickness of the membrane, $\epsilon$ is the elongation, and the coefficient K is 0.27 for a square membrane and 0.2 for a circular membrane.

If the elongation is a function of the temperature, the temperature coefficient of sensitivity is $$\frac{1}{S} \frac{\partial S}{\partial T} = \frac{K(a/h)^2 (\partial \epsilon/\partial T)}{1 + K(a/h)^2 \epsilon}$$

In this study, consideration has not been given to the temperature-dependences of the coefficients of elasticity, for in the case of silicon they are little.

It is an object of the present invention to provide a pressure detector in which it has been possible to eliminate the effect of the thermal expansion coefficient.

The invention is based on the following ideas:

The pressure detector construction comprises two glass parts and an elastic silicon membrane between them.

The silicon membrane is placed close to one of the glass parts and close to one capacitor plate consisting of a metal film on the face of the glass part.

However, the silicon membrane is not, at its edges, in direct mechanical contact with the said glass part, but it is placed at the end of a tube structure made of silicon and having a form of a cone, cylinder, etc.

The other end of the tube is attached to one of the glass parts.

The glass parts are connected and their relative distance is determined by a support piece of silicon.

The support piece, the tube, and the elastic membrane, all of them made of silicon, are made of one piece of silicon in order that a sufficiently good dimensional precision could be achieved for the air gap in the pressure-sensitive capacitor.

More specifically, the pressure detector construction in accordance with the invention is characterized by what is stated in the characterizing part of claim 1.

It can be considered the most important advantage of the construction that it prevents the effect of the state of tension produced by the different thermal expansions of silicon and glass on the properties of the silicon membrane sensitive to pressure.

The invention will be examined in the following in more detail with the aid of the exemplifying embodiment shown in the drawing FIGS. 2 to 4.

Figure 2:
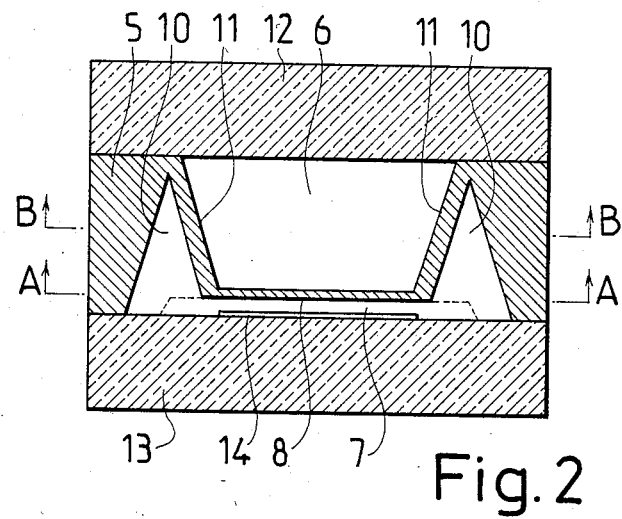
FIG. 2 is a partly schematical sectional side view of one detector in accordance with the invention.
Figure 3:
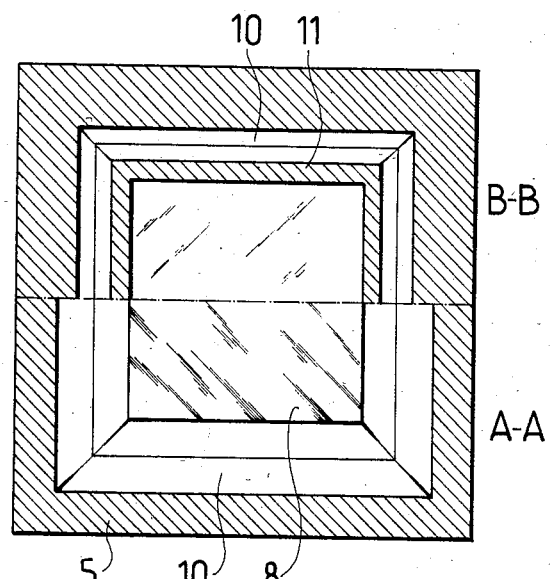
FIG. 3 shows the detector shown in FIG. 2, as a section along planes A-A and B-B and as viewed from below.

If it is not desired that the difference in thermal expansion affects the sensitivity of the detector, the membrane of the detector must be insulated so that no extending force is generated in it. FIGS. 2 and 3 show a pressure detector construction in which the horizontal forces acting upon the membrane have been eliminated.

The silicon plate has been processed by means of prior-art methods (cited paper [6]) so that a basin 6 is formed at one side thereof. Into the other side, a recess 7 has been worked. The membrane 8 sensitive to pressure is formed between the bottoms of the basin 6 and the recess 7. The membrane 8 (and the recess 7) is surrounded by a closed V-section groove 10. The wall between the groove 10 and the basin 6 forms a conical tube 11, one of whose ends is attached to the silicon plate 5 whereas the other end is closed by the membrane 8 sensitive to pressure. The basin 6 is covered by a glass plate 12, which is attached to the silicon plate 5 hermetically in a vacuum so that the basin 6 constitutes an aneroid capsule. Alternatively, the glass plate 12 may be provided with a hole, by means of which a reference pressure is passed into the chamber 6. A glass plate 13 is attached to the other side of the silicon plate 5, which glass plate 13 carries a stationary capacitor plate 14 made of a thin metal film.

When the temperature is raised, a tensile strain is produced in the faces of the silicon plate 5 in the horizontal plane. The strain causes a deformation at the end of the conical tube 11 facing the glass plate 12. If the tube 11 is dimensioned appropriately, the deformation is not essentially transferred to the tube end, or it is transferred only slightly to the tube end at which the membrane 8 sensitive to pressure is located. In this way, the effect of the temperature on the tensile strain on the membrane 8 is eliminated or reduced.

Figure 1:
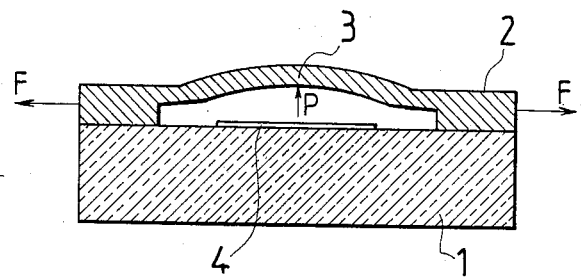
Figure 4:
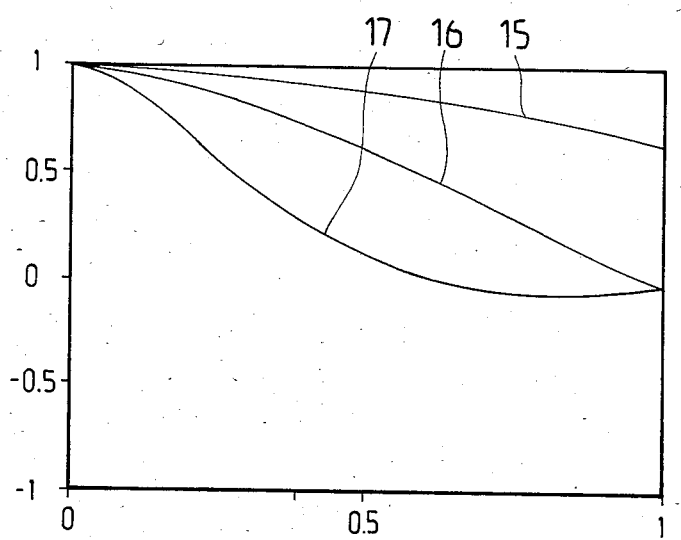
FIG. 4 shows the transfer of the deformation between the ends of the conical tube, by means of a normalized curve system.

In FIG. 4, in accordance with what was stated earlier, the transfer of the deformation between the ends of the conical tube is shown by means of a normalized system of curves. The horizontal axis represents the longitudinal axis of the tube 11. The distance between the ends of the tube 11 has been normalized as equal to one unit. The vertical axis represents the deformation of the tube when the deformation at the initial end is equal to one unit; curve 15 illustrates a rather short tube, curve 16 a longer one, and curve 17 an even still longer tube. In the case of a short tube, the deformation perpendicular to the axis has been reduced. In the case of an appropriately long tube, it is reduced to zero, but a torsion is produced at the end; the derivative of the deformation differs from zero. With a sufficiently long tube, both the deformation and its derivative approach zero. In such a case, the other end of the tube is completely isolated from any deformations taking place at one end of the tube.

Preferably, the depth of the basin 6 is at least 30 percent of the diameter of the bottom of the basin 6.

The dimensioning of the embodiment according to FIGS. 2 and 3 is as follows (typical ranges in parentheses):

Glass plates 12 and 13
  width and length: 7 mm (5 to 10 mm)
  thickness: 1 mm (0.5 to 1.5 mm)
Silicon plate 5
  thickness of plate: 0.7 mm (0.2 to 1.5 mm)
  thickness of membrane: 5 to 50 $\mu$m
  thickness of collar: 50 to 200 $\mu$m
Stationary capacitor plate 14
  thickness: 0.2 $\mu$m (0.1 to 1.0 $\mu$m)
Capacitor gap 7
  width: 4 $\mu$m (1 to 10 $\mu$m).

I claim:

1. A capacitive pressure detector comprising:
   a plate-shaped base,
   a stationary capacitor plate disposed on the base,
   a plate-shaped cover disposed at a distance from the base,
   a silicon plate disposed between the base and the cover and comprising a membrane-like middle portion with an edge area, an edge portion surrounding the middle portion, and a relatively thin-walled collar portion extending from the edge area of the middle portion to the edge portion, thus defining an aneroid capsule between the cover and the middle portion, said middle portion functioning as a mobile capacitor plate, the distance of which from the stationary capacitor plate changes by the effect of the pressure within the aneroid capsule, the edge portion and the collar portion defining between themselves a groove surrounding a basin and having a substantially V-shaped cross-section.

2. A detector as claimed in claim 1, wherein the aneroid capsule is hermetically closed by the cover.

3. A detector as claimed in claim 1, wherein the base and the cover are made of glass.

4. A detector as claimed in claim 1, wherein the depth of the basin is at least 30 percent of the diameter of the middle portion.

5. A detector as claimed in claim 1, wherein the collar portion has a conical form.

6. A detector as claimed in claim 1, wherein the collar portion has a pyramidal form.

* * * * *